US011848691B2

(12) United States Patent
Yu et al.

(10) Patent No.: US 11,848,691 B2
(45) Date of Patent: Dec. 19, 2023

(54) METHOD AND SYSTEM FOR INACTIVE AND ACTIVE BEAM TRANSITION IN A SATELLITE RADIO ACCESS NETWORK

(71) Applicant: AST & Science, LLC, Miami, FL (US)

(72) Inventors: Zhi Zhong Yu, Reading (GB); Federico Pedro Fawzi, Midland, TX (US)

(73) Assignee: Waymo LLC, Mountain View, CA (US)

(*) Notice: Subject to any disclaimer, the term of this patent is extended or adjusted under 35 U.S.C. 154(b) by 0 days.

(21) Appl. No.: 18/087,632

(22) Filed: Dec. 22, 2022

(65) Prior Publication Data

US 2023/0208511 A1      Jun. 29, 2023

Related U.S. Application Data

(60) Provisional application No. 63/292,914, filed on Dec. 22, 2021.

(51) Int. Cl.
*H04B 7/185* (2006.01)
*H04W 74/08* (2009.01)

(52) U.S. Cl.
CPC ..... *H04B 7/18532* (2013.01); *H04B 7/18513* (2013.01); *H04B 7/18539* (2013.01); *H04W 74/0833* (2013.01)

(58) Field of Classification Search
CPC .............. H04B 7/0617; H04B 7/18513; H04B 7/18532; H04B 7/18539; H04W 16/28; H04W 74/0833
See application file for complete search history.

(56) References Cited

U.S. PATENT DOCUMENTS

| | | | |
|---|---|---|---|
| 9,973,266 B1 | 5/2018 | Avellan et al. | |
| 9,998,193 B2* | 6/2018 | Wang | H04W 36/18 |
| 11,121,764 B2 | 9/2021 | Yao et al. | |
| 11,178,586 B2* | 11/2021 | Luo | H04W 36/0069 |
| 2014/0146782 A1 | 5/2014 | Gerlach et al. | |
| 2015/0110018 A1 | 4/2015 | Rosa et al. | |
| 2015/0111584 A1 | 4/2015 | Feria et al. | |

(Continued)

OTHER PUBLICATIONS

International Search Report and Written Opinion issued in corresponding International Patent Application No. PCT/US2022/082296, dated Apr. 27, 2023, 15 pages.

(Continued)

*Primary Examiner* — Alpus Hsu
(74) *Attorney, Agent, or Firm* — Botus Churchill IP Law LLP

(57) ABSTRACT

A Satellite Radio Access Network includes a base station for communicating with standard compliant user equipment (UE) via a satellite having a field of view. A network broadcasting signal is provided via an inactive or access beam covering a plurality of cells in the field of view. An access request is detected from a user device, such as a smartphone, within an area covered by the inactive beam. In response to the access request, a beam is transitioned from inactive to active to provide network access to the user device. Once the user device is out of range, the active beam is transitioned back to an inactive beam. An inactivity timer is used to detect an idle active cell that should be transitioned to an inactive cell.

17 Claims, 9 Drawing Sheets

(56) References Cited

U.S. PATENT DOCUMENTS

| | | | |
|---|---|---|---|
| 2016/0323800 A1 | 11/2016 | Ulupinar et al. | |
| 2017/0311217 A1 | 10/2017 | Jung et al. | |
| 2020/0052782 A1* | 2/2020 | Wang | H04B 7/1851 |
| 2020/0213000 A1* | 7/2020 | Arur | H04B 7/1851 |
| 2021/0251033 A1* | 8/2021 | Kanamarlapudi | H04W 28/0231 |
| 2022/0078801 A1* | 3/2022 | Huang | H04W 76/15 |
| 2022/0149922 A1* | 5/2022 | Wang | H04W 76/19 |
| 2022/0240151 A1 | 7/2022 | Yu et al. | |

OTHER PUBLICATIONS

A-Ra, Cho, et al., "Design of a Multi-Network Selector for Multiband Maritime Networks", International Journal of KIMICS, vol. 9, No. 5, Oct. 2011, pp. 523-529.

\* cited by examiner

200B

Many C3 clusters with 5MHz

C1, C7, C19 C37, C61, C91

C7 with 10 MHz

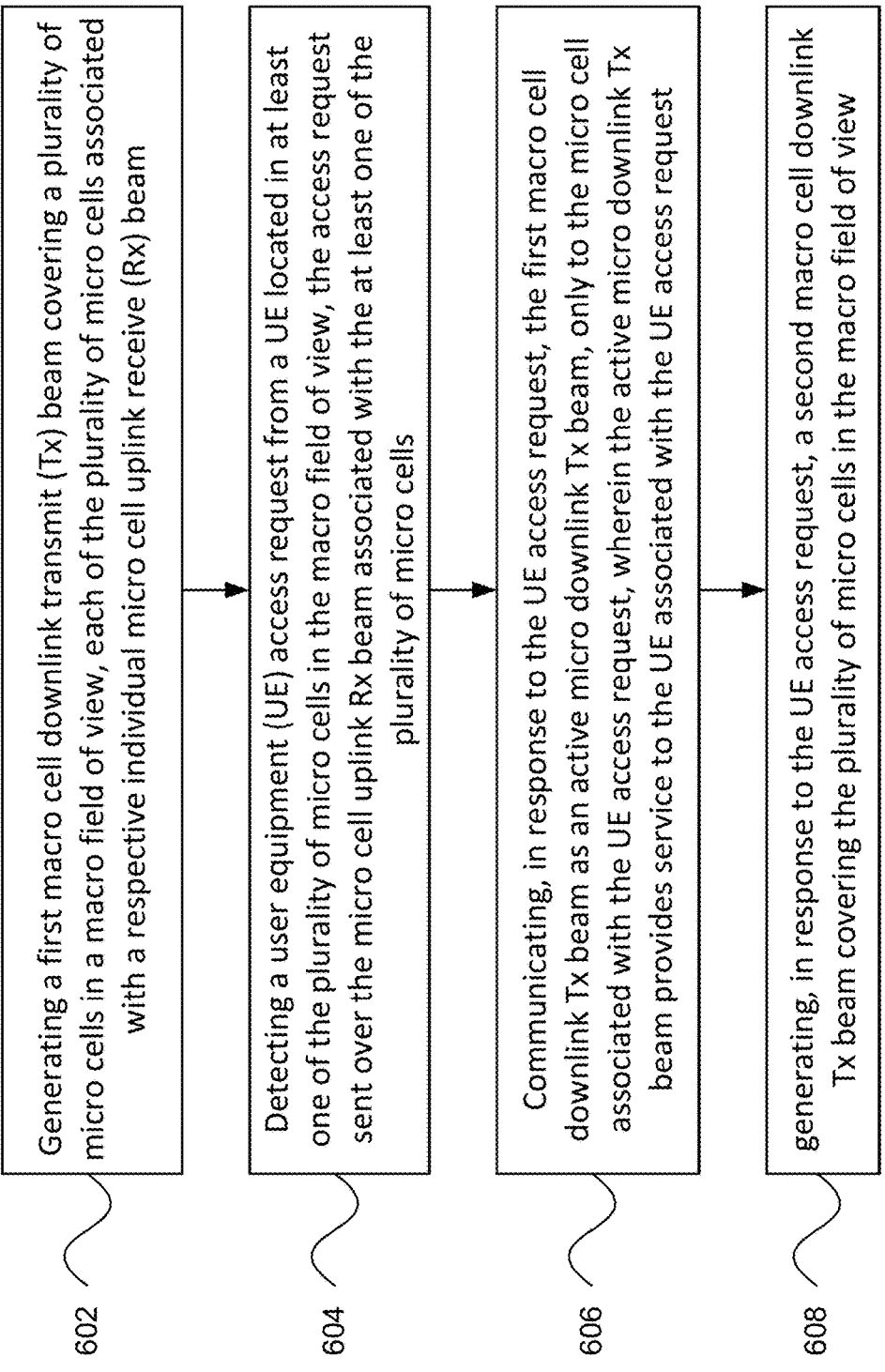

METHOD AND SYSTEM FOR INACTIVE AND ACTIVE BEAM TRANSITION IN A SATELLITE RADIO ACCESS NETWORK

CROSS-REFERENCE TO RELATED APPLICATIONS

This application claims the benefit of U.S. Provisional 63/292,914, filed Dec. 22, 2021, which is hereby incorporated by reference as if submitted in its entirety.

This application is related to U.S. Ser. No. 17/072,985, now U.S. Pat. No. 11,121,764, granted on Sep. 14, 2021, which is hereby incorporated by reference as if submitted in its entirety.

FIELD

The present disclosure relates to satellite radio access and, more specifically, a hybrid approach to satellite radio access network resource management by balancing inactive and active cells on a satellite using a modified GSM base station for direct satellite communications with unmodified GSM devices.

BACKGROUND

With the advancement of telecom, government and regulators of many countries require the operator of new deployment to cover 100% of the country, including areas with low demand that are hard to justify the cost. Regulators with such demands baffle mobile network operators (MNOs), as 3GPP RAN systems may be too expensive to provide full coverage. Therefore, there is a need in the art to provide Sat RAN (radio access network) resource management solutions to enable Sat RAN access to normal smartphones in remote areas where TN coverage cannot reach (e.g., 0G areas).

SUMMARY OF THE DISCLOSURE

The present embodiments may relate to, inter alia, systems and methods for providing a network of satellites to provide coverage to normal smartphones (i.e., standard GSM phone that typically communicates over 3GPP and is not modified or specially adapted to communicate via satellite, e.g., non-satellite phones) with requiring no modification to the normal smartphones. In some embodiments of the present disclosure, a network of satellites provides coverage to normal smartphones in remote areas, such as areas not covered by terrestrial cellular networks (e.g., GSM networks). In some embodiments of the present disclosure, a Satellite Radio Access Network (Sat RAN) turns a normal smartphone into a satellite phone without any changes to the smartphone. The prior-filed disclosure (U.S. Pat. No. 11,121,764) uses LTE 1.4 Mhz cell bandwidth. In the disclosed technology, GSM is added for a wider inactive access beam formed cell. When a RACH (Random Access CHannel) is received, the inactive wider beam is changed to an active spot beam. Depending on the service needed, it may, in some embodiments, provide handover to a newly provided LTE beam, or keep using the same GSM cell for a voice call.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

FIG. 6 illustrates a flow diagram 600 of an exemplary method in accordance with one or more embodiments of the present disclosure.

Figure 1:
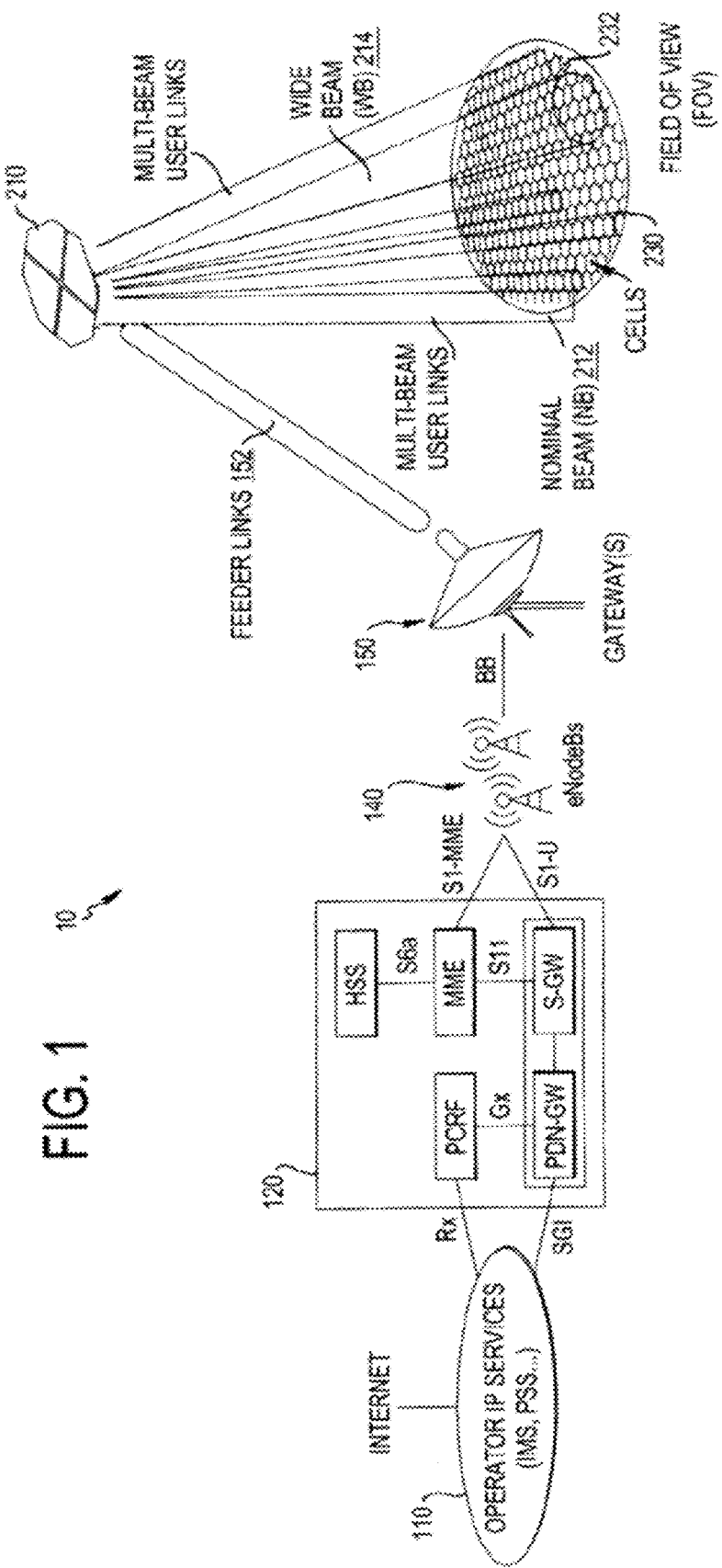
FIG. 1 illustrates a satellite system in accordance with one or more embodiments of the present disclosure.

The figures show illustrative embodiments of the present disclosure. Other embodiments can have components of different scale. Like numbers used in the figures may be used to refer to like components. However, the use of a number to refer to a component or step in a given figure has a same structure or function when used in another figure labeled with the same number, except as otherwise noted.

DETAILED DESCRIPTION

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

According to one or more embodiments, the disclosed technology addresses the need to provide a Satellite Radio Access Network (Sat RAN) that provides telecom services to normal smartphones in uncovered or under-covered areas globally at a similar cost as existing Terrestrial Networks (TNs), no matter where the smartphone is located. For example, using a Sat RAN, normal smartphones may get service in mountains, deserts, oceans, and remote non-residential regions. In some embodiments, Sat RANs may help to resolve the digital divide issue, also known as a 0G problem, where there is no network coverage.

According to one or more embodiments, the disclosed technology provides a benefit for all smartphone users by solving 0G issues on a global scale. For example, the disclosed technology may provide a satellite network and modified base stations (e.g., 2G/4G/5G base stations) so that the coverage may be formed from the satellite network. In some embodiments, the disclosed technology may enable a 3GPP RAN from space, rather than having to rely on ground-based towers. It can also help mature markets in developed countries, with a few percent of blind spots. For example, 2% of United Kingdom is 0G. Typically, a Sat RAN can easily provide coverage for remote places just as to a town center. However, the remote places do not have much in the way of demands and therefore coverage in remote places ideally should not use much of the Sat RAN resources which may be needed in other places of a satellite's field of view (FoV).

According to one or more embodiments, the disclosed technology may include the introduction of an inactive cell of a Sat GSM to handle providing network access to smartphones on demand. In some embodiments, such cases may provide the requested coverage with no extra Capital Expenditures (CapEx) and less than 1% Operating Expenses (OpEx). A GSM only needs 200 kHz to provide coverage to remote places and once there is such service demand of adequate RAT, bandwidth and services can be applied. Using GSM as access cells is fundamentally different than LTE, as they are two different types of RATs. GSM has a narrow band of the same power level as LTE, which gives much better receiving chances than a wide band signal (4G). Additionally, GSM is 7 dB more on its maximum Tx power as well. GSM starts from max power for RACH, while LTE would start from a lower one. According to one or more embodiments, the disclosed technology may provide GSM access via a low-earth orbit satellite. A Sat GSM may provide GSM at only 200 kHz and at a power of 30 dbm. Comparatively, LTE is only, maximally, 23 dbm. GSM therefore provides a higher power which is all focused within 200 kHz. In contrast, LTE is wide band—spread out and weaker, so for Sat GSM, it is easier to receive RACH.

Currently, satellite phones are the only solutions for remote areas with little to no cellular network access (e.g., 0G). However, they are not only far more expensive than smartphones, but also have far less functionality than a normal smartphone (e.g., a GSM phone). It would be beneficial to use a network of satellites to provide coverage and turn normal smartphones into Sat phones without any modification needed to the smartphones.

In the following description, for purposes of explanation, numerous specific details are set forth to provide a thorough understanding of the disclosed concepts. As part of this description, some of this disclosure's drawings represent structures and devices in block diagram form to avoid obscuring the novel aspects of the disclosed embodiments. In this context, references to numbered drawing elements without associated identifiers (e.g., 100) refer to all instances of the drawing element with identifiers (e.g., 100*a* and 100*b*). Further, as part of this description, some of this disclosure's drawings may be provided in the form of a flow diagram. The boxes in any flow chart may be presented in a particular order. However, the particular flow of any flow diagram is used only to exemplify one embodiment. In other embodiments, any of the various components depicted in the flow chart may be deleted, or the components may be performed in a different order, or even concurrently. In addition, other embodiments may include additional steps not depicted as part of the flow chart. The language used in this disclosure has been principally selected for readability and instructional purposes and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming but would nevertheless be a routine undertaking for those of ordinary skill in the art of image capture having the benefit of this disclosure.

In the disclosed technology, one or more embodiments are described that provide solutions to current issues that remote areas experience with respect to cellular network coverage. These issues include, but are not limited to A) Provision cost issue, B) Low demand issue, and C) 3GPP specs work assumption issue.

A: Provision cost issue: Remote places have no infrastructure and lack electricity to run radio equipment, which makes it difficult for a network operator to provide RAN services. They often lack effective protection of the equipment as well. Often not enough skilled people are available to support, own and maintain RAN technology in wide remote places: which is often the case in deprived areas, such as Africa.

B: Low demand issue: Even if provision cost is not a problem, the low demand in any area makes it difficult to invest for such a use case, as the investment on both CapEx and OpEx can hardly be justified. This is often the case even in developed or developing countries. However, there are important needs for that coverage. For example, so that emergency calls may be made.

C: 3GPP specs work assumption issue: The 3GPP specs had been made for mass market on a global scale, not for one individual use occasionally in remote places, and few need mobile services most of the time. With the advancement of the global telecom technology, the corner case like coverage issue becomes the hot topic. Mobile device users become accustomed to the convenience of mobile devices and assume everywhere they venture should be provided with cellular network coverage.

In some embodiments, the provisioning issue may be resolved by the disclosed technology. While a Sat RAN requires a ground station, like a data center, the ground station can be far away from the cells the Sat RAN actually serves. For example, the ground station can be a thousand kilometers away (e.g., on the edge of a city) and be able to cover large swaths of land. For example, a Sat RAN as described herein may be able to cover large portions of a country, if not an entire country.

In some embodiments, the low demand issue may be resolved by the disclosed technology. For example, an inactive wider beam of GSM spot beam for satellite cell may be used to lower the OpEx on a solar power and feeder link. Additionally, or alternatively, less (e.g., $1/7$) feeder link bandwidth than the smallest LTE cell can cover an even larger area by using a GSM cell as the access cell. It is also much easier to put GSM RACH detector at the satellite to further help with the efficient RACH detection to each of the spot beam granularity without costing any feeder link bandwidth at inactive state, which can be 99.9% of time for a massive inactive cell areas. This is the unique advantage sat RAN has. With such a technique disclosed here sat RAN technology can cover the ocean with minute amount of extra cost, making it ideal for the global coverage even in oceans. This may further reduce the concerns of the low demand issue. Further, it can also improve the pre-emptive random-access response (RAR) on LTE DL. In addition to the beam handover, delay compensation and Doppler compensation, this is another technical improvement for Sat RAN resource management and a major difference to cell handling from the terrestrial network (TN).

In some embodiments of the disclosed technology, the Sat RAN's ground station may have a database to store and maintain cell locations. The database may be accessed by redundant multi-RATs (e.g., 2G, 4G, 5G), BTS, eNBs, and gNBs of various cell bandwidths. Each may have various cell bandwidths and various capacities waiting to provide services. Their System Information and Core Network parameters may be changed dynamically according to the needs of network users. In contrast, TNs typically have an initial configuration and never need to be changed. So much so they waste a lot electricity in the night when not much of the services are needed. So with sat RAN disclosed here, TN can also benefit from saving the OpEx. (a 2012 data showed that global RAN electricity cost was $500 million)

An inactive cell is a state of a cell that is not currently being used (e.g., no user equipment is using voice or data services), but is ready to serve any prospective user by turning it into an active cell. An active cell is a state of a cell that is currently being used (e.g., at least one voice or data call is ongoing). The inactive cell has one major difference to an active normal cell in the disclosed technology, namely it can expand to many times bigger than a normal cell. That is, a normal cell has a narrower or spot beam width (e.g., about 48 km for low band—below 1 GHz) and its cell size will largely stay the same until itself is changed to an inactive cell. An inactive cell mainly serves as an access cell and it is preferred to be as big as possible to over large areas (e.g., oceans) where normally there is low demand of services. With extended TA, GSM can stretch to more than 120 km cell radius, but for an inactive beam/cell that is not even a limit, as its function is only for RACH detection. Hence TA range limit does not apply. The TA range only matters to the active spot beam which will take over for the user traffic once the RACH is detected. It is in action from the moment of RACH response.

Many of TN cells are in idle state in midnight, such case is short in general, no more than a few hours at night. Hence, no one bothers to give a dedicated state for eNB or gNB or BTS. However, the disclosed teachings may save power and lower the operation expenses.

Along the same concept comes resource allocation on demand, which is vitally important for a Sat RAN. In some embodiments, the solar power and feeder link, as well as the satellite hardware operation performance, are better used to serve people and real applications in thousands of square kilometers the satellite is serving. If there is none, or fewer user equipment (UEs) using the resources and capability, it would be better to use GSM due to its minimal cost on bandwidth per unit area. The spectrum may be provided balancing solar power to provide coverage to other cells where there are more demands most of the time. A simple calculation shows the resource ratio comparison to a normal TN cell in densely populated areas. For example, the calculation of the spectrum saving ratio comparison between TN deployment and Sat RAN. Further improvement may be added to justify Sat RAN global coverage. Normal TN deployment: 20 MHx CBW 2T2R for 1 square km area. Sat RAN remote (ocean) deployment to provide coverage as inactive cell: 200 kHz 1T1R for 3000 square km area, only using ⅛ time; factor of 8. Area factor: 3000/1=3000; Frequency BW factor: 20e6×2/200e3=200. Total factor of spectrum resource saved is 3000×200×8=4,800,000 compared to ground TN deployment. The significance grows with the area under concern. A low-earth orbit (LEO) satellite, for example, may provide services to an area 2800 km in diameter, making it a vital part of the system design. While transitions between inactive and active beam avoids major resource waste, the generic resource management schemes described herein may optimize the whole system to perform better and gain more efficiency. The scale of Sat RAN makes this aspect important enough that it deserves a dedicated design to handle it properly.

In some embodiments of the disclosed technology, the inactive and active cells may balance the usage of resources on a Sat RAN. The resources for a Sat RAN may include, but is not limited to, the precious feeder link bandwidth for each satellite and the solar power available on the satellites.

To address resource usage, a further technical development is provided that can scale down the cost in such use cases, especially the resources for a Sat RAN, and be able to provide on-demand services from the Sat RAN. Due to the contrast of the large area (2800 km diameter) of a Sat RAN serving area, or field of view (FoV), and the small number of users in some of those areas occasionally. Based on 3GPP standards, this can be rather wasteful and too expensive to do. The present disclosure provides 100% coverage in vast remote areas not yet been covered by TN, and at an extra resource cost less than 0.0001% of normal TN deployment due to very occasional usage. The most important difference is that the no coverage or under covered vast area can be covered or connected by the disclosure, fundamentally solving the 0G issue on truly global scale without much of extra cost.

For purposes of this disclosure, user equipment (UE) is referred to as "smartphones." However, in one or more embodiments, the user equipment referred to as "smartphones" could be any kind of device that sends and receives wireless communication signals, such as smartwatches, fitness bands, tablet PCs, access points (e.g., hotspots), smart glasses, NB-IoT and the like.

A satellite cellular system is shown in FIG. 1 composed of large antennas on a satellite generating a large quantity of narrow beams for user links, gateway beams with large operational bandwidth for routing user beam traffic and network access information to and from gateway stations or an associated ground network.

FIG. 1 shows a high-powered large phased-array satellite system 10 that creates a large number of beams 212 covering small terrestrial cells 232 on the Field of View (FOV) 230 of a given satellite 210. The system 10 includes a base station 100 that communicates with the satellite 210. The base station 100 can have Base Transceivers such as BTS in 2G and eNodeBs 120 in 4G system, also referred to as baseband unit (BBU), and a processor/core 140 (such as BSC switch core in 2G, the Evolved Packet Core in 4G system) that communicates with the Internet 110. This disclosure has a small light weight sub BBU system for RACH detector on satellite introduced for further saving the feeder link bandwidth—see FIG. 2A, the (P)RACH detector 120(C) at the satellite 210. The BBU 120 communicates signals to a gateway 150 having an antenna such as a directional antenna that communicates with the satellite 210 via gateway link signals 152. In one embodiment, the satellite 210 can be a single satellite device. In another embodiment, the satellite 210 can be a plurality of satellite antenna elements, such as disclosed in U.S. Pat. No. 9,973,266, the entire contents of which are hereby incorporated by reference.

The satellite 210 receives the gateway antenna signals 152 and retransmits them as signals to user terminals located in the satellite FOV 230, which includes one or more cells 232. The satellite signals include multi-beam user links which comprise nominal (micro) beams (NB) 212, and wide (macro) beam (WB) 214 provided by the satellite phased array antenna.

Unmodified user devices connect to these beams 212, 214 as they would to a local cell tower in a terrestrial system. The signals from/to the user devices are directed by the satellite system to/from the gateway 150 via high-throughput gateway feeder links (such as Ka-band links, Q/V band links, or laser links). The total gateway link bandwidth is sufficient to accommodate the aggregated signals from all beams (cells) including traffic and network/access signals. At the gateway 150, the user signals are digital and/or analog processed and interfaced with custom Base Transceivers such as BTSs, eNodeBs and gNodeBs 120.

These customized BBUs 120 provide a standards-compliant interface to unmodified user devices, allowing them to connect as they would to a local tower while compensating for the effects (such as delay and Doppler shift) of the satellite communication system. The BBUs 120 are modified to tolerate large latency due to signal propagation to/from a satellite 210. Delay and Doppler shift are compensated at each cell (beam) center so the differential delay and Doppler over a size limited cell will be small and within the standard UE capability.

Figure 2A:
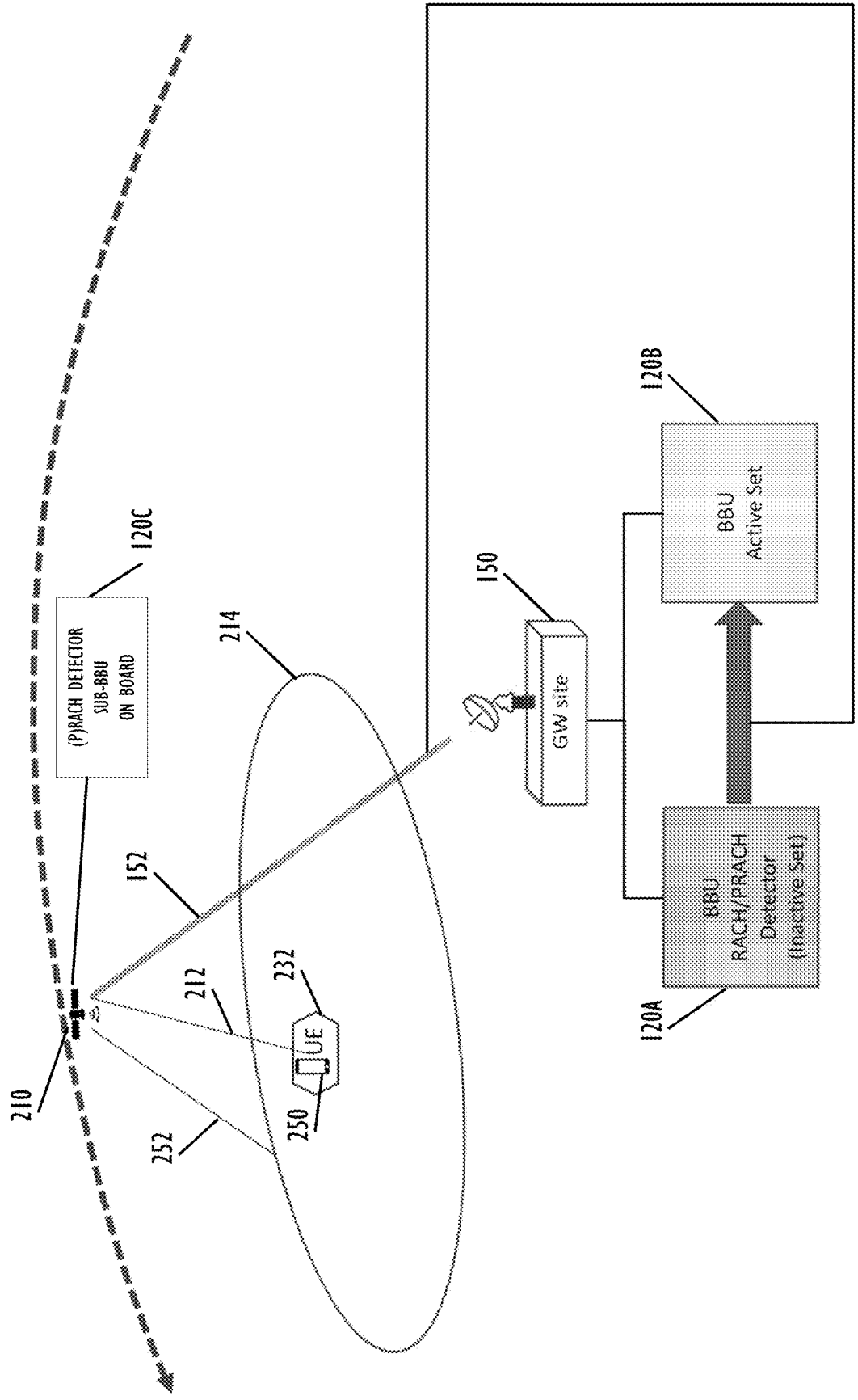
FIG. 2A illustrates a satellite system implementation of a hybrid approach for satellite radio access in accordance with one or more embodiments of the present disclosure.

Referring to FIG. 2A, various functions and operations in accordance with the present disclosure may be implemented by a communications system 200A that includes, for example a processing device. In one embodiment, the communications system includes a ground station 150 having one or more BBUs (here shown as a first BBU 120A and a second BBU 120B), and database for storing information. In some embodiments, the ground station 150 has a BBU pool. The ground station can be located on the edge of cities. The processing device can be the BTS, eNodeB or gNodeB (BBU), and provided with one or more of a wide variety of components or subsystems including, for example, wired or wireless communication links, and/or storage device(s) such as memory or a database. All or parts of the system, processes, and/or data utilized in the present disclosure can be stored on or read from the storage device. The ground station communicates with UEs 250 at the cells 232 via satellite 210. An exemplary path traveled by satellite 210 is shown by dashed line 254, such as during low-earth orbit (LEO). The processing device can execute software that can be stored on the storage device. Unless indicated otherwise, the process is preferably implemented in automatically by the processor substantially in real time without delay.

A remote area (with few calls) access beam or signal 252 that is wider than the normal spot beam cell area (48 km diameter) may be processed by the on-board sub BBU system for just RACH detector 120C. The wide beam 252 transmits just enough power for the UEs to acquire a low bandwidth cell, either a 200 kHz GSM ARFCN (Absolute Radio-Frequency Channel Number) or a lowest LTE CBW allowed for the band used. The carrier may broadcast the system info, provide paging if any incoming call is for any of those UEs 250 and may detect RACH (Random Access Channel). This may be a GSM channel, for example, and only occupy 200 kHz.

Once a UE is active in the wide beam 252 area, such as by a data call being placed by the UE, a PRACH detector at the first BBU 120C detects that the UE is active and generates a CFRA (Contention Free Random Access). The sub BBU 120C transmits the CFRA to the second BBU 120B (BBU Active Beam). The second BBU may have pre-defined active cells for this wide area (See FIGS. 3A-3C). Upon receiving of the CFRA (e.g., RACH for GSM or PRACH (Physical Random Access Channel)), from the PRACH detector of first BBU 120A, the second BBU 120B configures normal Rx beams 212 in the new active cell identified by the corresponding Rx beam that detected the (P)RACH to carry on with the response, where the TA is definitely within the UE 250 expected range by 3GPP definition (naturally a pre-requisite for the best serving cell).

The (P)RACH detector 120(C) sends an activation request to BBU 120B and handover to 120A for providing the required active service using the same cell ID to streamline the newly active UE service request, or changed to other cells (like 2g to 4G) as needed. In this example, the BBU Active beam 212 provides the required service to the designated beam/area for the cell in which the UE is active. Thus, the UE for that cell communicates over an active beam 212, and the wide access beam 252 continues to communicate with all the cells 232 as before will be given another access cell to carry on its inactive wider cell duty. Once the UE 250 disconnects, and the cell is again inactive, the Active BBU 120B stops service and the access or inactive beam 252 serves the area as an access cell. Inactive to active and back to inactive cycle will meet the demand.

Figure 2B:
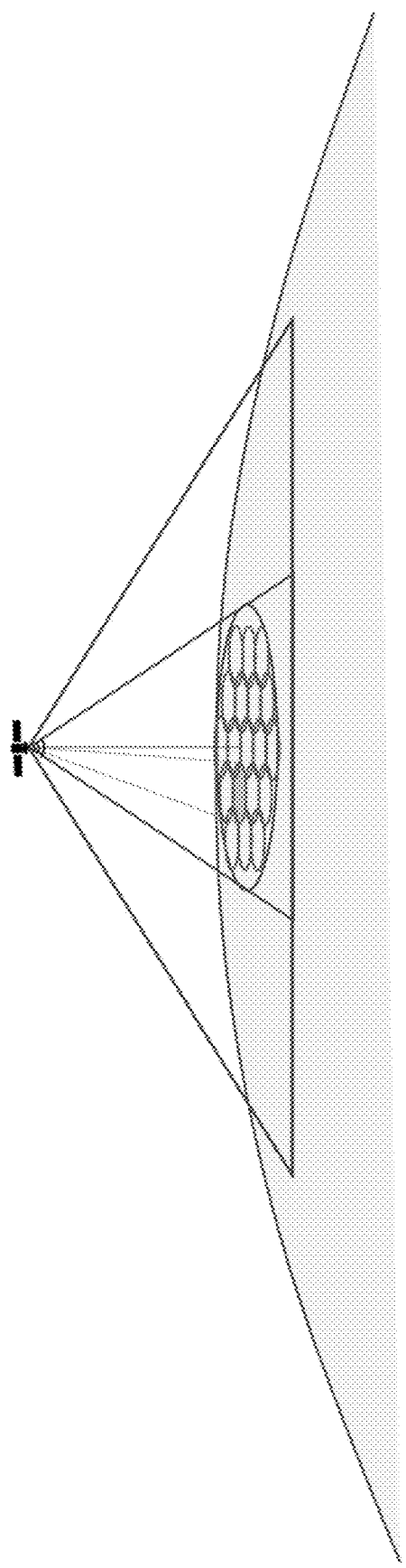
FIG. 2B illustrates inactive wider beam that is many times bigger than an active spot beam—a satellite system implementation of a hybrid approach for satellite radio access in accordance with one or more embodiments of the present disclosure.

Referring to FIG. 2B, various functions and operations in accordance with the present disclosure may be implemented by a communications system 200B that includes, for example a processing device. In one embodiment, the communications system includes a satellite 210 providing an inactive wide beam (e.g., GSM beam C19) 250. In this example, beam 250 provides coverage to a cluster of cells 256 (e.g., C19). In some embodiments, each cell and cluster of cells may have its own TRx cells from more than one satellite. This enables an NCC ("network control center") to balance loading of the system and manage system resources. Additionally, feeder links and eNBs' load balancing, inactive/active cell and cell bandwidth (CBW) may be applied on-demand and changed as necessary. Duplication of a cluster, such as C7, may be equally feeder link friendly when electrical power is a/v. In some embodiments, a power efficient approach is provided based on power, area, distance, and elevation angle. Different variations may be utilized to balance resources effectively. See

TABLE 1

| Satellite Elevation Angle (degrees) | Cluster | Diameter ratio to a spot beam cell | Diameter (km) | Region |
| --- | --- | --- | --- | --- |
| 46 | C7 | 3 | 144 | Non-Residential |
| 57 | C19 | 5 | 240 | Natural Beauty |
| 62 | C37 | 7 | 336 | Mountain Range |
| 67 | C61 | 9 | 432 | Desert |
| 72 | C91 | 11 | 528 | Oceans (Nadir beam) |

In some embodiments, the way to detect which cell is the active cell among the wider inactive beam (IAB) is provided. By turning on the Rx beams for each of the narrow beams in the cluster of inactive wider beam only while keeping one wider Tx beam for the whole cluster. To make it more efficient part of BBU in 120A can be duplicated on-board the satellite and referred to the (P)RACH detector 120(C), where (P)RACH detection can be performed without using feeder link extra bandwidth. There would be only 1T1R feeder link pair but can take care of 7 to 19 normal cell sizes in C7 and C19 configuration. This saves feeder link and solar power resources by factor of 7 or 19, in comparison of enabling 7 or 19 active beams (AB), and no issue in paging, TAC and NW S1 connection setup and tear down (for those that has no active UE) while the actual needs is keeping 1T1R. So, by enabling just the Rx beam would be more efficient to streamline the process for a better user experience, instead of turning all of the IABs to AB.

Another example feature of the disclosed technology is paging consideration for IAB and how that should be done and join the RACH follow-up. This particular point sets the real difference of real service. The coverage has MT call (mobile terminated, i.e. if someone calls the UE in remote cell that has IAB) covered. Yet another feature of the present disclosure is on-sat signal processor for the (P)RACH detector 120(C) that is added for Rx beam assistant on RACH/PRACH detection.

Figure 3C:
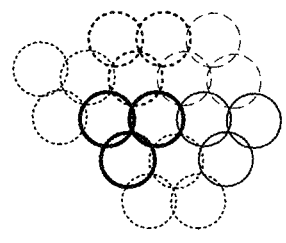
FIGS. 3A-3C illustrate exemplary pre-defined active cells and cell clusters for a wide area in accordance with one or more embodiments of the present disclosure.
Figure 3B:
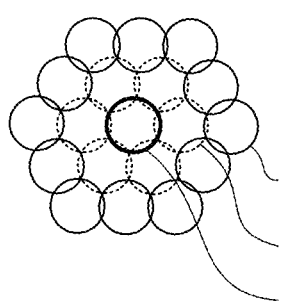
Figure 3A:
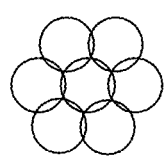

Referring to FIGS. 3A-3C, three nonlimiting examples are provided of cell clusters at different frequencies. Cell clusters may be, for example, cell cluster 256 of FIG. 2B. In some embodiments, utilization of a hybrid system with a wider GSM BCCH (Broadcast Control Channel) ARFCN and further multi-RAT (2G+4G) pool of BBU with various cell bandwidth (CBW) may be provided. This example hybrid system may dynamically meet the demand of a few thousands of cells served by a ground station (GS) via a few satellites mobile services. In FIG. 3A, an example cluster of seven cells (e.g., C7) is shown at 10 MHz. In FIG. 3B, an example cluster of cell clusters is shown (e.g., Cl, C7, C19). In FIG. 3C, another example cluster of cell clusters is shown (e.g., C3), each operating at a frequency of 5 MHz.

The system uses GSM 200 kHz BW for the inactive cells and get the UEs RACH. Since there are three different types of RACH indicating UE's intentions BTS on the Gateway site can invoke CS voice call or with RRC reconfiguration message to move the UE to LTE cell when Pack switched data service is needed. At the same time the UE location is known and an active LTE beam can be available for the UE location area.

In some embodiments, an inactive cell only has the DL signals: in 2G, FCCH and SCH and SIBs; in 4G, PSS/SSS/CRS/MIB/SIBs, and in both 2G and 4G examples paging as MT call support is needed, but it remains an inactive cell until a (P)RACH is detected. Additionally, a RACH is the trigger from wider inactive to narrow spot beam active cell. When a user's device does a location area or tracking area update, then the cell will transition to an active cell. Each cell, either inactive or active, remains or becomes inactive cells when a cell inactivity timer expires, as described herein. Inactive wider cells, on a detected RACH, two actions will be taken: one the WB access cell transition to NB TRx spot beams on the identified active cell/beam, which will be the new active cell. For example, if it is a GSM voice call RACH, a GSM call handling will start right from the same inactive cell as the UE sees. If it is a data call, 2G RRC reconfiguration message will divert it to a LTE cell which step in to handle the LTE CFRA PRACH. Two the previous access WB is given another ARFCN to carry on its inactive cell duty.

In some embodiments, an inactive wide beam may include a cluster of 7 to 19 inactive cells within a circular area that has diameter of 160 km or more, much bigger than 3GPP specs defined Timing advance (TA) range for up to 100 km in 4G, or 120 km with extended TA in 2G. The solution is to employ many Rx beam from spot beams and have the on-board (P)RACH detector. The actual communication to the UE is still arranged in NB active cell, and no impact or violation to TA range RAN defined for unmodified UEs.

In some embodiments, one 1.4 MHz CBW may be provided per inactive cell if the band, feeder link BW and onboard power allow. Alternatively, one 1.4 MHz CBW may be provided per 7 and 19 inactive cell cluster if the band allows, but in case-feeder link BW and onboard power fall short, GSM access WB cell is a much better alternative. In yet another alternative, if the band does not allow 1.4 MHz, then the GSM is the only best approach for access WB inactive cell.

For a new active UE, its mobility should also be considered: There are two ways to handle it: The best way is to track the UE with the electronically steerable beam, so that it would always be covered. This can be done with the TA and delay and Doppler compensation to the moving cell center. The alternative way is to change the BBU serving the neighbor spot beam. Both are active beam standard configuration for sat RAN operation and should be used in this case as well.

The satellite system disclosed herein may operate with user equipment that comprises standard cellular phones without any modification for NTN. The application of the technology may be provided for better use of resources, such as electricity and radio spectrum usage. Additionally, the application of the disclosed technology may provide for power saving in Sat RAN and TN.

Figure 4A:
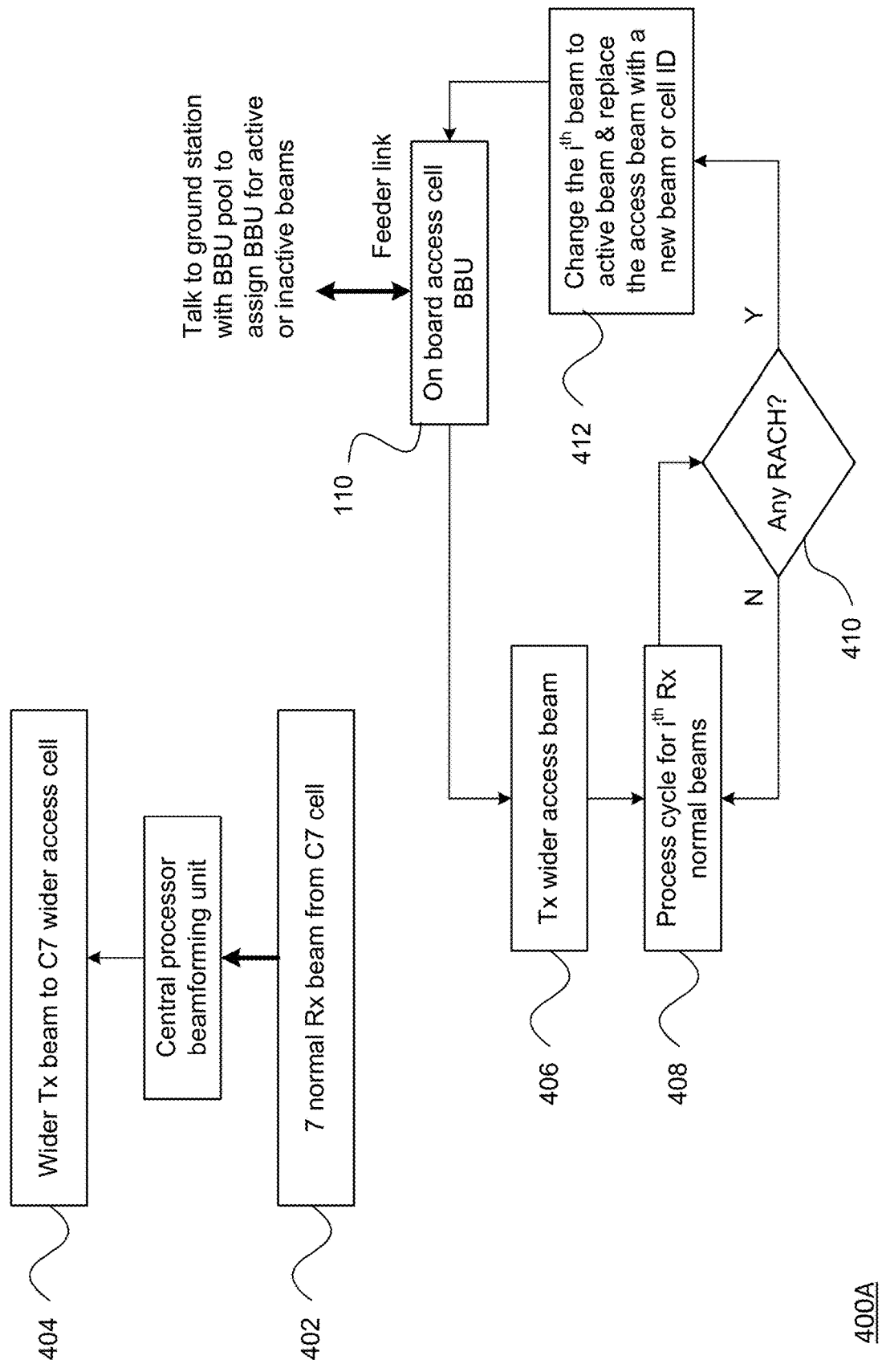
FIG. 4A illustrates a diagram 400 of Sat RAN system resource management in accordance with one or more embodiments of the present disclosure.

Referring to FIG. 4A, flow chart 400A, an example method for managing resources of a Satellite Random Access Network (Sat RAN) is provided. The method may be implemented by one or more modules of the base station 100, a central processor beamforming unit (CPBF) of satellite 210, an access cell baseband unit (BBU) subsystem 110, or a combination thereof. For purposes of explanation, the following steps will be described in the context of FIGS. 4B and 4C. However, the various actions may be taken by alternative components. In addition, the various actions may be performed in a different order. Further, some actions may be performed simultaneously, and some may not be required, or others may be added.

Figure 4B:
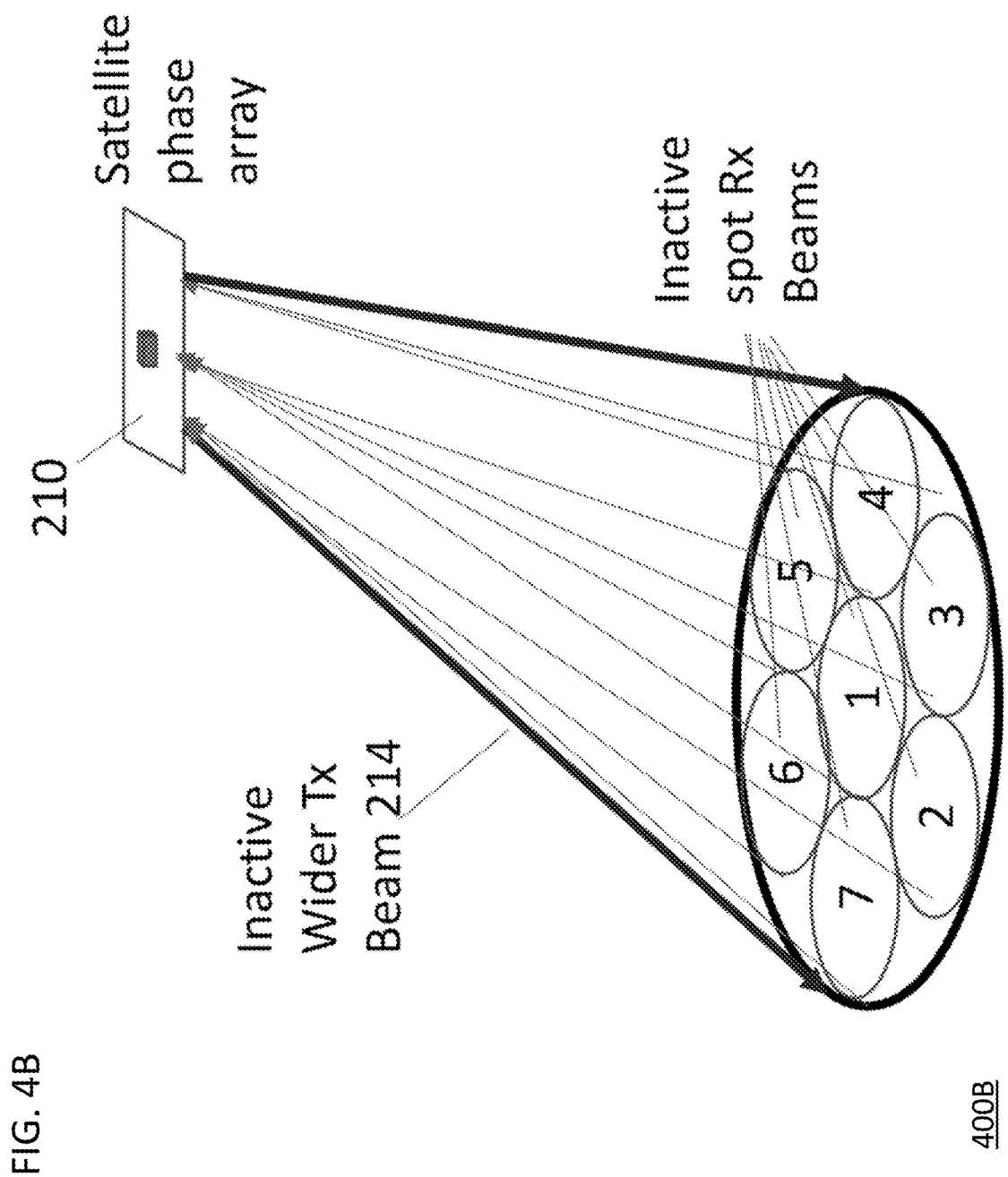
FIGS. 4B and 4C illustrate an exemplary cell cluster in accordance with one or more embodiments of the present disclosure.
Figure 4C:
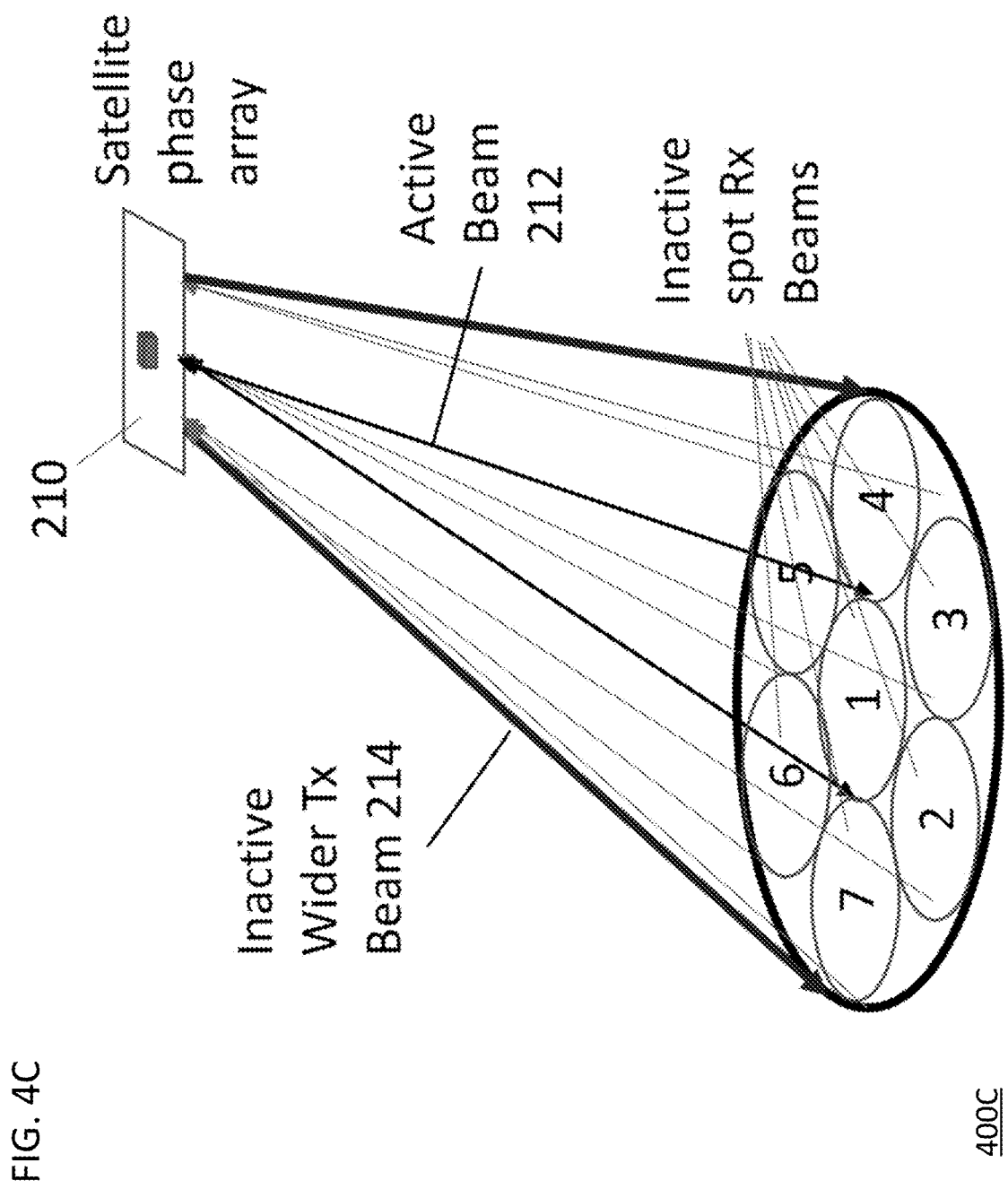

Flow chart 400 illustrates the operation, for instance, of C7 (a macro cluster cell having seven micro cells), see FIGS. 4B and 4C, micro cells numbered 1-7. Operation starts at step 404, the first BBU 120A transmits (FIG. 4B) a wider macro inactive transmit (Tx) beam 214, to a wider macro access cell (having micro cells 1-7) in remote areas, such as part of the ocean; and receives individually over normal micro receive (Rx) beams 212, step 402. A CPBF (Central Processor Beam Forming) unit at the satellite 210 processor handles not only TRx beams, but also different numbers of them with its beam forming for Tx and Rx to different cells and tracking them as the satellite 210 orbiting above the cells via the massive phase array 210.

Additionally, or alternatively, the CPBF and BBUs 120 can provide multi-RAT (radio access technology), such as by switching between 2G, 4G and 5G. Multi-RAT is part of the 3GPP standards, and may be used together as a mechanism for power and spectrum saving and as a resource management option for Sat RAN. To save the feeder link bandwidth, there is a baseband subsystem at the satellite processor that handles the (P)RACH detector 120(C) to handle the TRx beams: step 406, with the system broadcasting cycles, step 408, and detect and process the potential RACH 410 and paging autonomously while keeping the minimum link with the BBU farm on the ground gateway station through the feeder link. Once a RACH is detected on any of the Rx beam, the inactive wide macro Tx beam 214 (FIG. 4B) may be changed, or transitioned, to be utilized as an active Tx micro beam 214A (FIG. 4C); whereas, for example, the active Tx micro beam 214A (which communicates only with the active micro cell at which an active UE was detected having a stronger signal) has the same frequency and/or channel and/or phase as the inactive wide macro Tx beam 214 (which communicates with the entire macro cell cluster C7 having a weaker signal).

Delay and Doppler compensation may be provided to the new active spot beam 214A's cell center. Concurrently, the previous wider inactive beam 214 may be replaced with another GSM inactive cell macro Tx beam 216 (FIG. 4C) by the BBU on another ARFCN in step 412, so that it can handle any further RACH in the wider and feeder link will immediately assign from the BBU pool to serve the user in that normal cell. The BBUs 120A and 120B coordinate to enable a new wide inactive beam 216, as shown in FIG. 4C, that replaces the previous inactive beam 214 (FIG. 4B). Similar to a transition between IAB and AB, this is a transition between RATs, serving the purpose in much wider scope and solving the issue with wider choices and more granularity to fit in more situations better. The described GSM to 4G RACH avoids the pre-emptive CBRA, which solves the RTT 40 ms without waste of resources, a much better way of handling the Sat RAN RACH issue. In some embodiments, a timer may be used in the decision making. Additionally, or alternatively, there can be a user device location to help with the decision of finding the AB.

Thus, once an active UE is detected, the initial access wide Tx macro beam 214 (FIG. 4B) that communicates with the macro cell C7, is transitioned to a micro beam 214A that communicates only with the active micro cell (micro cell 1 in FIG. 4C). A first macro cell downlink transmit (Tx) beam is generated covering a plurality of micro cells in the macro field of view to communicate with the plurality of micro cells in the macro field of view. Each of the plurality of micro cells is associated with a respective individual micro uplink receive (Rx) beam. The system then detect a UE access request from a UE located in at least one the plurality of micro cells in the macro field of view, the access request sent over the micro cell uplink Rx beam associated with at least one of the plurality of micro cells.

In addition, once an active UE is detected, a new inactive wide Tx macro beam 216 is formed that communicates with the macro cell C7 over a different channel and/or frequency and/or phase than the active micro beam 214A. That is, in response to the UE access request, the first macro cell downlink Tx beam communicates as an active micro downlink Tx beam, only to the micro cell associated with the UE access request, wherein the active micro downlink Tx beam provides service to the UE associated with the UE access request. While the initial wide Tx beam 214 is described as being replaced by the new wide Tx beam 216, the beams 214, 216 need not be the same beam but can be different beams.

Finally, in further response to the UE access request, a second macro cell downlink Tx beam is generated that covers the plurality of micro cells in the macro field of view, and communicates with the plurality of micro cells C7 in the macro field of view.

Notably, the micro receive Rx beams need not change once the UE access request is detected. Rather, the micro receive Rx beams can stay the same; though in some embodiments a different micro Rx beam can be utilized.

A network control center (NCC) may be provided to log events as they occur to perform data collection. According to one or more embodiments, cells may report their running status (e.g., inactive/active) to an NCC. Reports may be provided on a regular basis for BHO decisions (e.g., every 5 minutes). Reports may also include load capacity of each cell (e.g., 0% for inactivity, 100% for full capacity). In some embodiments, a network manager may provide updates and reports, such as state of network, current demands, expected demands, and when to transition a cell between inactive and active, and vice versa. The BHO opportunity would be at least time for changing AB to IAB, if such a change is suitable. BHO may happen, for example, every 4 to 5.5 minutes, which complements effective on-demand resource management as described by the disclosed technology. Additionally, network management decisions may include which RATs and BWs to use. An inactivity timer may be assigned a value T1. Records may be kept and updated continuously.

In some embodiments, a module of an on board BBU subsystem may determine whether a cell is idle (e.g., inactive). If not idle, the cell is an active cell. If idle, at point of finishing the call, an inactivity timer for the idle cell is started in the process of going back to an inactive call. Additionally, the one or more modules may determine, with a gateway, if an active cell should go back to be part of an inactive cell. The process may then loop back to manage IAB and AB as a clockwork.

In some embodiments, GSM 200 kHz BW for inactive cell to get a RACH from a user's device. Since there are three different types of RACH indicating the user device's intentions, a BTS on the Gateway site may invoke CS voice call or with RRC reconfiguration message to move the user's device to an LTE cell when Pack switched data service is needed. At the same time, the user device's location is known by the individual Rx 212 and an active LTE beam can be available for the device's location area.

In some embodiments, an inactive cell only has the DL signals PSS/SSS/RS/MIB/SIBs, and paging as MT call support is needed, but it remains an inactive cell until a RACH is detected. RACH is the trigger from wider inactive to narrow spot beam active cell. When there is a user device that does location area or tracking area update, then the cell will be an active cell. Each cell, either inactive or active, remains or becomes inactive cells when the cell inactivity timer expires. Inactive wider cell, on detected RACH, open Rx spot beams to its sub normal cells and identify the best serving beam, which will be the new active cell, as described herein.

Figure 5:
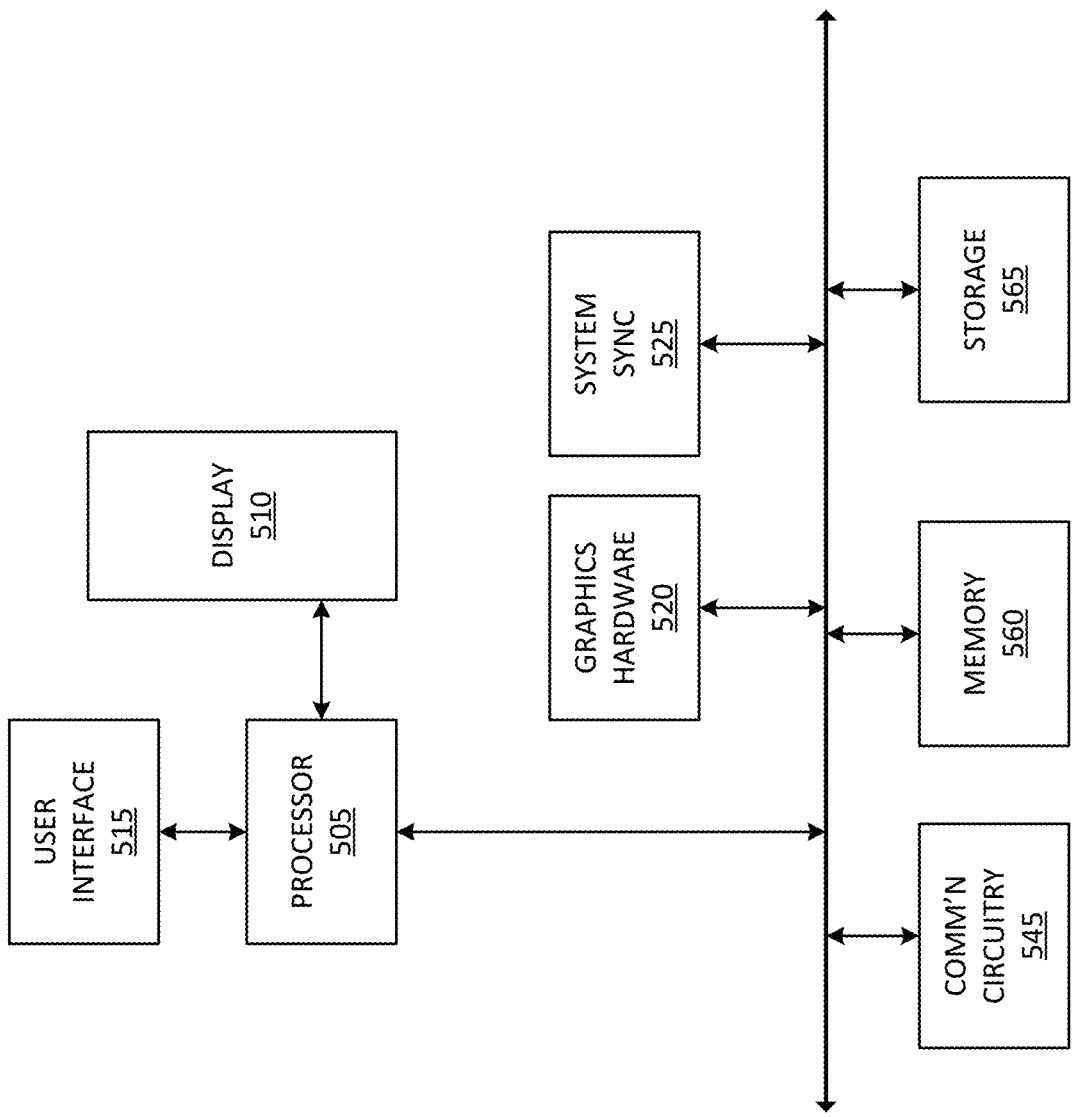
FIG. 5 illustrates a block diagram 500 of an exemplary computing device in accordance with one or more embodiments of the present disclosure.

Referring now to FIG. 5, a simplified functional block diagram of illustrative multifunction device 500 is shown according to one embodiment. Multifunctional device 500 may show representative components, for example, for devices of base station 100, operator IP services of internet 110, and devices of satellite 210 of FIG. 1. Multifunction electronic device 500 may include processor 505, display 510, user interface 515, graphics hardware 520, communications circuitry 545, memory 560, storage device 565, and communications bus 570. Multifunction electronic device 500 may be, for example, a personal electronic device such as a personal digital assistant (PDA), personal music player, mobile telephone or smartphone, or a tablet computer.

The synchronization unit 525 holds the key for system clockwork, by which the processor 505 controls the feeder link packing and use feeder link M&C (maintenance and control) channel to implement the changes between IAB and AB as well as the dynamic cell handling, including the BHO to other satellites in their orbits. Feeder link 152 is a wideband multi-giga Hz link that provide the lifeline for each satellite, hence the importance of managing the IAB and Abs. This saves more than 50% of the resource usage. Hence it is vital for the full sat RAN operation as a whole.

Processor 505 may execute instructions necessary to carry out or control the operation of many functions performed by device 500. Processor 505 may, for instance, drive display 510 and receive user input from user interface 515. User interface 515 may allow a user to interact with device 500. For example, user interface 515 can take a variety of forms, such as a button, keypad, dial, a click wheel, keyboard, display screen and/or a touch screen. Processor 505 may also, for example, be a system-on-chip such as those found in mobile devices and include a dedicated graphics processing unit (GPU). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 to process graphics information. In one embodiment, graphics hardware 520 may include a programmable GPU.

Data may be stored in memory 560 and/or storage 565. Memory 560 may include one or more different types of media used by processor 505 and graphics hardware 520 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to tangibly retain computer program instructions or code organized into one or more modules and written in any desired computer programming language. When executed by, for example, processor 505 such computer program code may implement one or more of the methods described herein.

FIG. 6 illustrates an example method 600. At block 602, the method includes generating a first macro cell downlink transmit (Tx) beam covering a plurality of micro cells in a macro field of view, each of the plurality of micro cells being associated with a respective individual micro cell uplink receive (Rx) beam. At block 604 the method includes detecting a user equipment (UE) access request from a UE located in at least one of the plurality of micro cells in the macro field of view, in which the access request is sent over the micro cell uplink Rx beam associated with the at least one of the plurality of micro cells. At block 606 the method includes communicating, in response to the UE access request, the first macro cell downlink Tx beam as an active micro downlink Tx beam, only to the micro cell associated with the UE access request, wherein the active micro downlink Tx beam provides service to the UE associated with the UE access request. And in block 608, the method includes generating, in response to the UE access request, a second macro cell downlink Tx beam covering the plurality of micro cells in the macro field of view.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all.

The invention claimed is:

1. A satellite communications system, comprising:
   one or more base stations having scheduling capability configured to communicate with standard compliant user equipment (UE) via a satellite having a macro field of view, at least one of the one or more base stations comprising a memory to store instructions that cause a processer to:
   generate a first macro cell downlink transmit (Tx) beam covering a plurality of micro cells in the macro field of view, each of the plurality of micro cells associated with a respective individual micro cell uplink receive (Rx) beam;
   detect a UE access request from a UE located in at least one of the plurality of micro cells in the macro field of view, the access request sent over the micro cell uplink Rx beam associated with the at least one of the plurality of micro cells;
   communicate, in response to the UE access request, the first macro cell downlink Tx beam as an active micro downlink Tx beam, only to the micro cell associated with the UE access request, wherein the active micro downlink Tx beam provides service to the UE associated with the UE access request; and
   generate, in response to the UE access request, a second macro cell downlink Tx beam covering the plurality of micro cells in the macro field of view.

2. The satellite communications system of claim 1, wherein the first macro cell downlink Tx beam is configured to transmit system and paging information.

3. The satellite communications system of claim 1, wherein the first macro cell downlink Tx beam is configured to cover a wider band than the active micro downlink Tx beam.

4. The satellite communications system of claim 1, wherein the one or more base stations comprises a plurality of base stations, and each base station in the plurality of base stations has long round trip time (RTT) aware scheduling capability.

5. The satellite communications system of claim 4, wherein the long RTT is 44 ms.

6. The satellite communications system of claim 4, wherein the aware scheduling capability is performed by a delay and Doppler compensation (DD&C) device.

7. The satellite communications system of claim 1, wherein the first macro downlink Tx beam has a first frequency, the active micro downlink Tx beam has the first frequency, and the second macro downlink Tx beam has a second frequency different than the first frequency.

8. The satellite communications system of claim 1, wherein the active micro downlink Tx beam does not communicate with the plurality of micro cells from which the UE access request was not detected.

9. The satellite communications system of claim 1, wherein the system is configured to operate in a Global System for Mobile communication (GSM) mode.

10. A satellite comprising:
a baseband unit (BBU) having scheduling capability configured to communicate with standard compliant user equipment (UE) via the satellite, said BBU comprising a memory to store instructions that cause a processer to:
generate a first macro cell downlink transmit (Tx) beam covering a plurality of micro cells in a macro field of view, each of the plurality of micro cells associated with a respective individual micro cell uplink receive (Rx) beam;
detect a UE access request from a UE located in at least one of the plurality of micro cells in the macro field of view, the access request sent over the micro cell uplink Rx beam associated with the at least one of the plurality of micro cells;
communicate, in response to the UE access request, the first macro cell downlink Tx beam as an active micro downlink Tx beam, only to the micro cell associated with the UE access request, wherein the active micro downlink Tx beam provides service to the UE associated with the UE access request; and
generate, in response to the UE access request, a second macro cell downlink Tx beam covering the plurality of micro cells in the macro field of view.

11. The satellite of claim 10, wherein the BBU comprises a random access channel (RACH) detector.

12. The satellite of claim 11, wherein the RACH detector is a Global System for Mobile communication (GSM) RACH detector.

13. A method for satellite communications, the method, with at least one computing device, comprising:
generating a first macro cell downlink transmit (Tx) beam covering a plurality of micro cells in a macro field of view, each of the plurality of micro cells associated with a respective individual micro cell uplink receive (Rx) beam;
detecting a user equipment (UE) access request from a UE located in at least one of the plurality of micro cells in the macro field of view, the access request sent over the micro cell uplink Rx beam associated with the at least one of the plurality of micro cells;
communicating, in response to the UE access request, the first macro cell downlink Tx beam as an active micro downlink Tx beam, only to the micro cell associated with the UE access request, wherein the active micro downlink Tx beam provides service to the UE associated with the UE access request; and
generating, in response to the UE access request, a second macro cell downlink Tx beam covering the plurality of micro cells in the macro field of view.

14. The method of claim 13, wherein the first macro cell downlink Tx beam transmits system and paging information.

15. The method of claim 13, wherein the first macro cell downlink Tx beam covers a wider band than the active micro downlink Tx beam.

16. The method of claim 13, wherein the first macro downlink Tx beam has a first frequency, the active micro downlink Tx beam has the first frequency, and the second macro downlink Tx beam has a second frequency.

17. The method of claim 13, wherein the active micro downlink Tx beam is not communicating with the plurality of micro cells from which the UE access request was not detected.

* * * * *